Oct. 6, 1970  G. BALCKE ET AL  3,532,962
ENCAPSULATED SOLID STATE VOLTAGE REGULATOR FOR AUTOMOTIVE USE
Filed Dec. 26, 1968  4 Sheets-Sheet 1

INVENTORS
Gerhard BALCKE
Hans REICHELT
By their ATTORNEYS

Oct. 6, 1970  G. BALCKE ET AL  3,532,962
ENCAPSULATED SOLID STATE VOLTAGE REGULATOR FOR AUTOMOTIVE USE
Filed Dec. 26, 1968  4 Sheets-Sheet 2

INVENTORS
Gerhard BALCKE
Hans REICHELT
By their ATTORNEYS

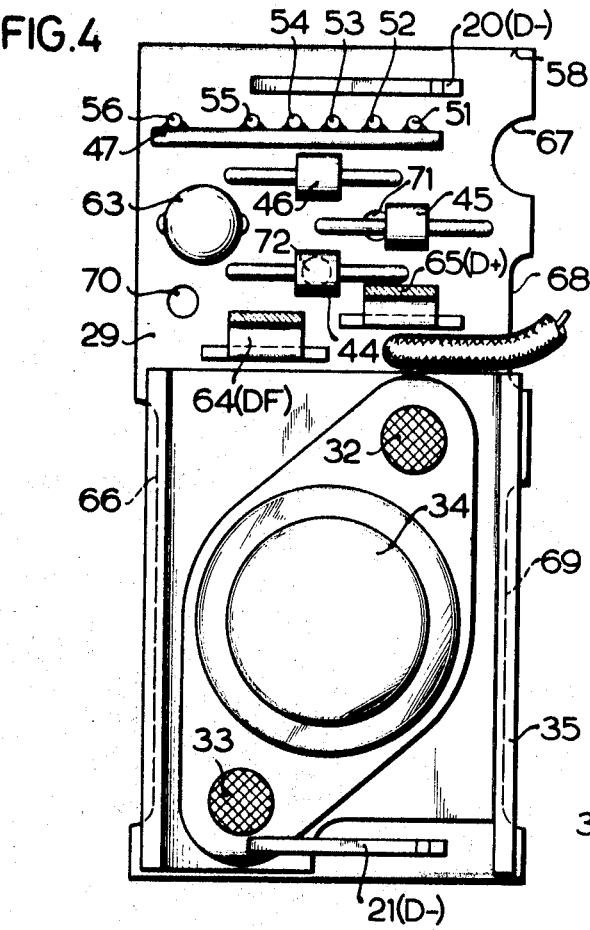
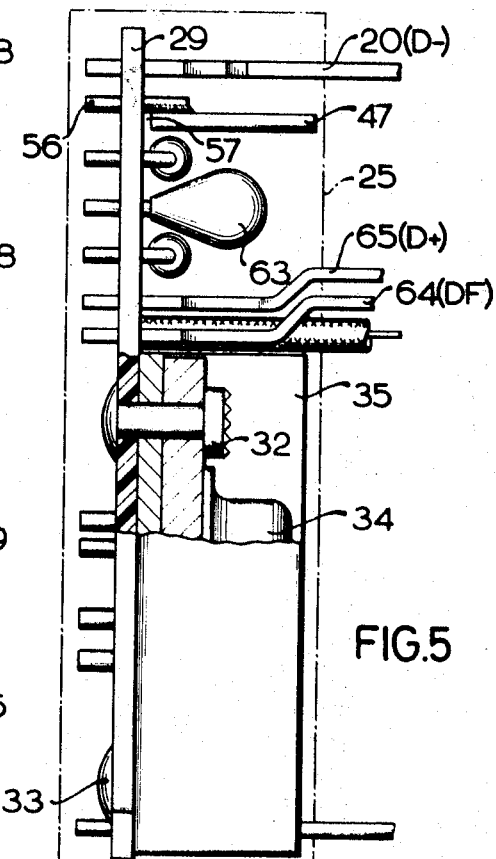
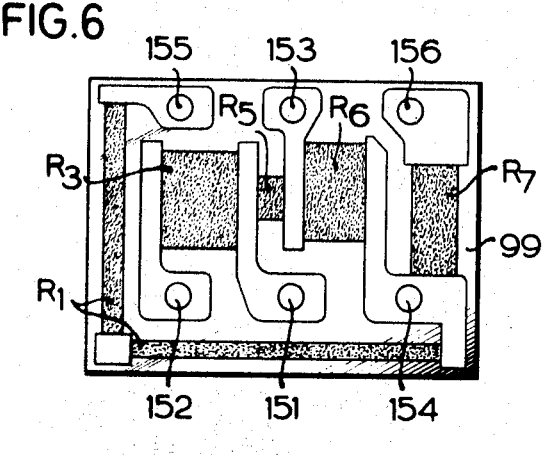
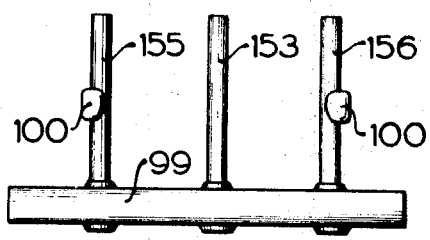

Oct. 6, 1970 G. BALCKE ET AL 3,532,962
ENCAPSULATED SOLID STATE VOLTAGE REGULATOR FOR AUTOMOTIVE USE
Filed Dec. 26, 1968 4 Sheets-Sheet 4

INVENTORS
Gerhard BALCKE
Hans REICHELT

By their ATTORNEYS

United States Patent Office 3,532,962
Patented Oct. 6, 1970

3,532,962
ENCAPSULATED SOLID STATE VOLTAGE
REGULATOR FOR AUTOMOTIVE USE
Gerhard Balcke, Neustadt, and Hans Reichelt, Stuttgart,
Germany, assignors to Robert Bosch GmbH, Stuttgart,
Germany, a limited liability company of Germany
Filed Dec. 26, 1968, Ser. No. 786,935
Claims priority, application Germany, Feb. 10, 1968,
1,613,983
Int. Cl. H02p 9/30; H02k 11/00
U.S. Cl. 322—28                     14 Claims

ABSTRACT OF THE DISCLOSURE

To prevent damage due to stresses during encapsulation of a solid state voltage regulator, active semiconductor elements are enclosed in a transistor shell secured to a support plate carrying a printed circuit; the support plate in located within a rectangular housing, and a resistance plate is secured to the support plate, arranged to be parallel to a wall of the housing so that stresses due to temperature change will not result in any bending forces on the resistance and semiconductor connections.

---

The present invention relates to a solid state voltage regulator for automotive use, and particularly to a solid state semiconductor-type voltage regulator for connection to a three-phase alternator for motor vehicles, in which the solid state regulator is totally encapsulated within a resin compound.

It has previously been proposed to totally encapsulate the elements of a solid state voltage regulator (see Austrian Pat. 246,275, assigned to the assignee of the present invention). Operating experience has shown that stresses may result within the regulator unit during, and after the encapsulation, particularly if a settable plastic resin is used. These stresses exert mechanical forces on the elements and their connections, which may cause damage. The wide temperature range in automotive use— from −30° C. to +80° C., and even higher, requires special precautions, particularly in view of the utmost reliability demanded from automotive electrical equipment.

It is an object of the present invention to provide an encapsulated voltage regulator, particularly for automotive use, which will provide trouble-free performance even under the most severe operating conditions.

Subject matter of the present invention.—Briefly, the active semiconductor elements, together with directly connected resistances are interconnected and all located within a separate, standard commercially available power transistor shell. The shell itself is secured to a support plate, which carries a printed circuit. A resistance plate, or disk, on which a plurality of interconnected resistances are deposited, is likewise secured to the support plate. The resistance plate is so arranged that it will be parallel to a wall of the housing so that it will not be subject to bending stresses but, in case of temperature change or expansion, only subject to parallel shift, even if the encapsulating compound changes its volume with temperature. The active semiconductor elements themselves, within the transistor shell, are not directly touched by the encapsulating compound and thus, the elements or their connecting leads will not be subject to damage. Preferably all resistances are either located within the transistor shell, or form part of the resistance plate. Additional circuit elements, such as a condenser can be soldered directly to the printed circuit.

The invention will now be described by way of example with reference to the accompanying drawings, wherein:

FIG. 4 is a plan view of the assembled electrical elements of the voltage regulator, in enlarged view;

FIG. 5 is a partial side view of the assembled electrical elements;

FIG. 6 is an enlarged view of a different form of resistance plate;

FIG. 7 is a side view of the plate of FIG. 6;

Figure 1:
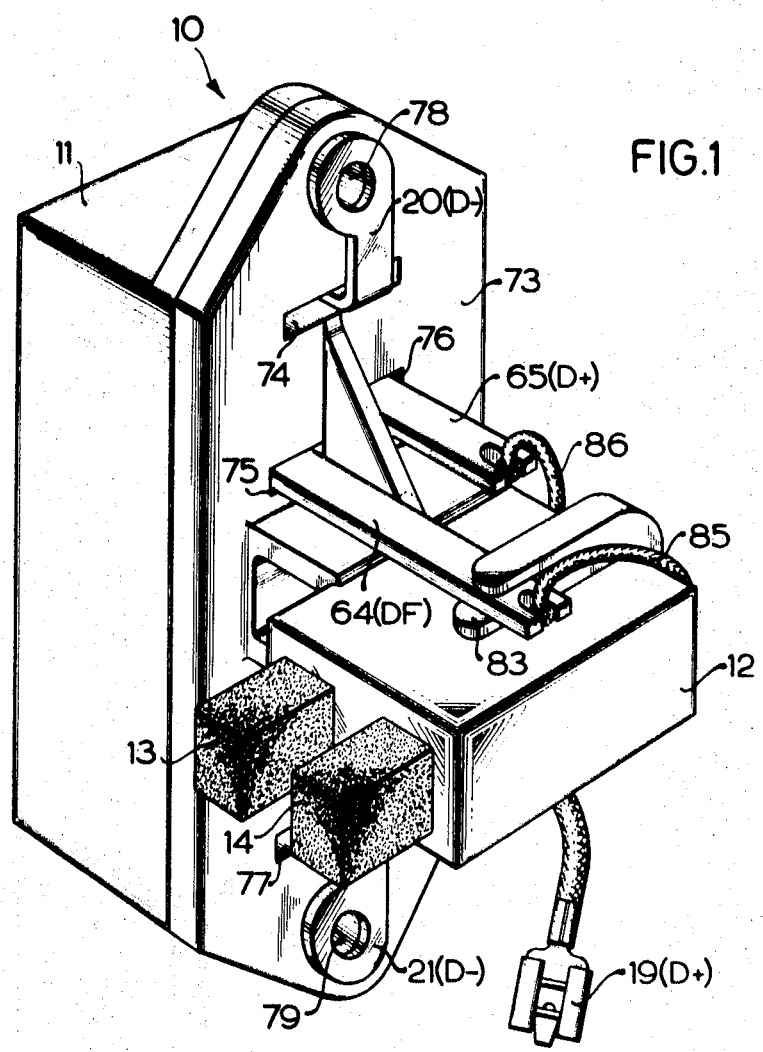
FIG. 1 is a perspective view of the solid state voltage regulator combined with a brush holder for an automotive-type alternator.
Figure 9:
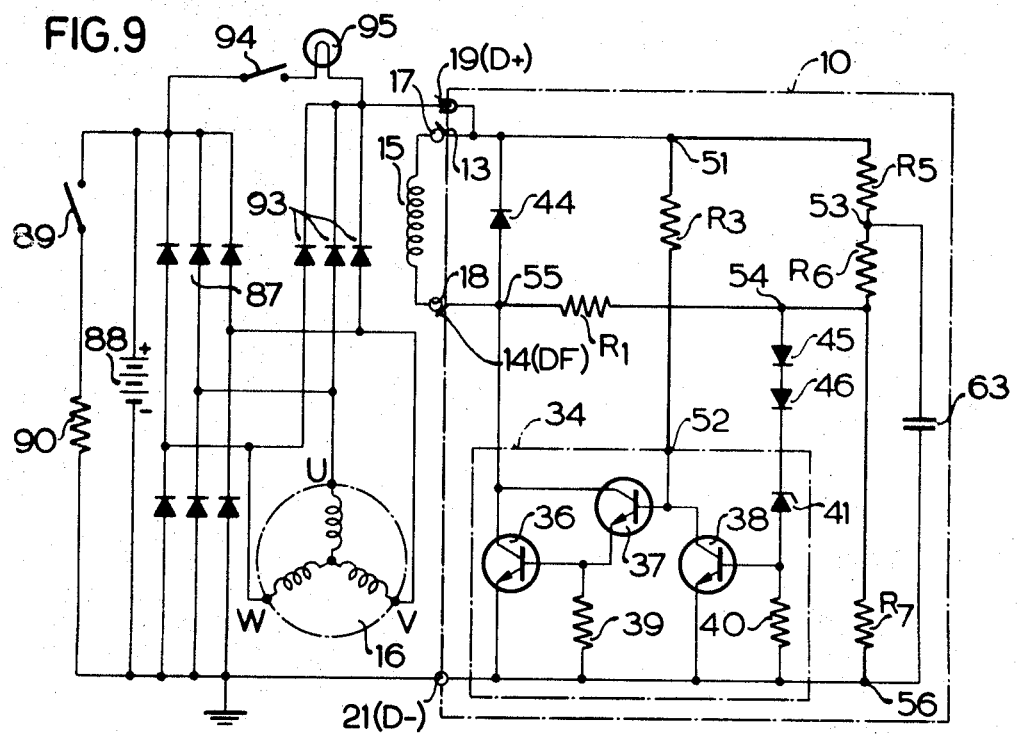
FIG. 9 is a complete electrical circuit diagram of a solid state voltage state regulator.

Referring now to FIG. 1.—The automotive-type solid state voltage regulator 10 includes voltage regulator housing 11 and a brush holder portion 12, in which a pair of brushes 13, 14 are retained to connect with a pair of slip rings 17, 18 of a three-phase alternator 16 (FIG. 9). These brushes, as are customary, are spring-biased to engage the alternator, for example by small springs retained behind the brushes in brush guide holes formed in brush holder 12, and not shown in the drawings since such construction is well known in the art. A connecting plug 19 provides terminal D+, and a pair of contact lugs 20, 21 form the D− connections, which lugs 20, 21 are bent over so as to bear against the housing of generator 16 and provide a contact to the chassis of the vehicle.

Figure 2:
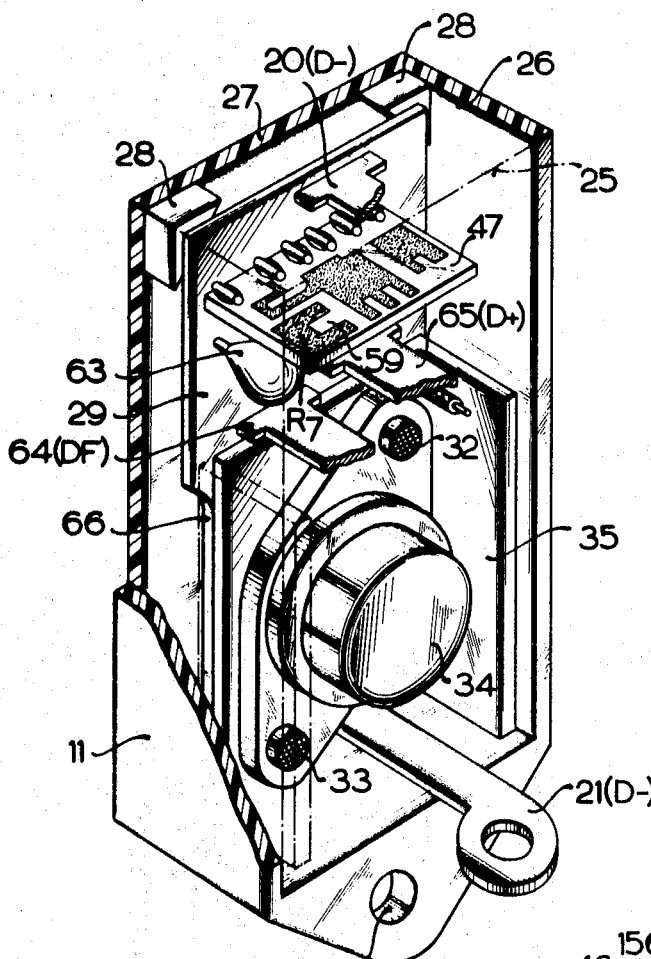
FIG. 2 is a perspective view of the voltage regulator, partly broken away and partly in phantom, before assembly to a brush holder.

The construction of the voltage regulator itself is best seen in FIG. 2. The completed regulator is filled with an encapsulating compound up to the chain-dotted line 25 (FIGS. 2 and 5). This compound, schematically illustrated at 26, may be an epoxy resin or the like, cast around all the electrical elements within regulator housing 11 to completely seal them and protect the components against mechanical stresses, humidity, gases, and other contamination.

Four seats 28 project from the bottom wall 27 of housing 11 (only two are seen in FIG. 2), to form bearings and supports for a base or support plate 29. Plate 29 has a printed circuit applied to the side facing bottom 27 of housing 11. The upper, or facing side (FIG. 2) acts as a support for connecting elements. A transistor shell 34, which may be a commercially available power transistor housing shell, is secured with a pair of rivets 32, 33 to a heat sink 35, in general of U-shaped cross section. Shell 34 encloses three npn transistors 36, 37, 38, a pair of resistances 39, 40 and a Zener diode 41 in an assembled, hybrid network. All the active semiconductor elements 36, 37, 38 of the voltage regulator therefore are contained within shell 34, thus effectively protecting the active elements against mechanical stresses arising in the encapsulating compound 26.

Three diodes 44, 45, 46 are secured to base plate 29; diode 44 is connected in parallel to the field winding of generator 16 to act as a floating, bypass diode, to pass current decaying in the inductive field winding 15. Diodes 45, 46 which are silicon diodes are series connected and provide temperature compensation for Zener diode 41.

A resistance plate, or disk 47, provided with six connecting pins 51 to 56 (FIGS. 4 and 8) is secured to respective connecting openings formed in the printed circuit on support plate 29. The pins 51 to 56 are soldered to the resistance plate 47 with a solder material which has a higher melting point than the solder material interconnecting the pins to the printed circuit on support plate 29. Thus, plate 47 can be secured to support plate 29 with very small clearance, or even adjacent thereto, as best seen in FIG. 5. If there is a little clearance, only a very thin layer 57 of encapsulating compound 26 will be between support plate 25 and resistance plate 47. Changes in dimensions of this thin layer do not affect the electrical connections between resistance plate 47 and support plate 29. The edge of resistance plate 47 is close to a longitudinal edge 58 of base plate 29, and parallel thereto, so that it is parallel to a wall of the housing 11. Changes in dimension of the encapsulating compound 26 thus, at the most, cause a parallel shift of the resistance plate 47, which may twist about the connecting pins 51–56, without introducing, however, a bending moment into the plate 47 itself.

Figure 8:
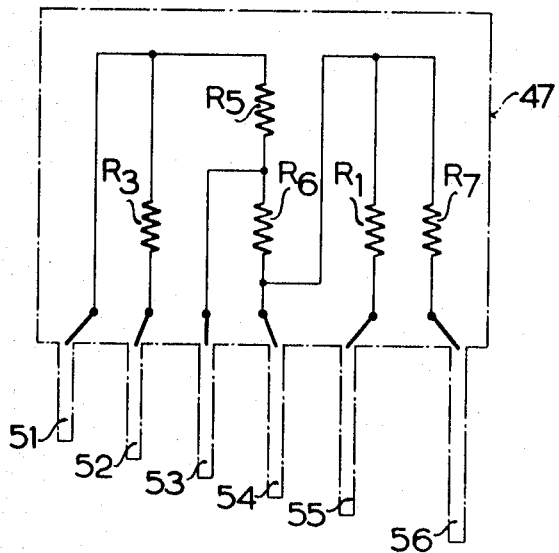
FIG. 8 is a schematic representation of the arrangement of resistances on the resistance plate in accordance with FIGS. 1 and 2.

Five resistances R1, R3, R5, R6 and R7 are applied to resistance plate 47, to together form a resistance network as best seen in FIG. 8. The resistances, and connections of this network are illustrated in FIG. 9 with heavy lines; it includes all resistances other than the two resistances 39, 40 which are directly connected to the active semiconductor elements and are enclosed within shell 34. The actual arrangement of the resistance deposits on plate 47 is best seen in FIG. 2, in which the resistance material itself is shown stippled. Resistance R7 is horseshoe-shaped. Increasing the notch 59, increases the resistance value. Increase of the resistance value of resistor R7 increases the output voltage as controlled by the regulator. The notch 59 may be manufactured by applying a pulse laser beam to resistance R7, evaporating applied resistance material in the region of the notch 59 until resistance R7 has the desired value. Alternatively, other radiation may be used, for example, an electron beam.

A condenser 63 is further secured to support plate 29; connecting lugs 64, 65 are additionally secured to the plate 29 and soldered to the printed circuit at the bottom thereof.

In order to obtain reliable distribution of the encapsulating resin 26 within housing 11, plate 29 is formed with notches and openings, for example four notches 66 to 69 along the longitudinal edges and three passages 70, 71, 72. Air bubbles within the encapsulating compound 26 can thus be avoided while still permitting insertion of support plate 29 into housing 11 with only small clearance.

The brush holder portion 12 is formed with a cover plate 73 for housing 11. Cover plate 73 has four openings 74–77 (see FIG. 1) through which the various connecting lugs 19, 20, 21, 64 and 65 extend. In manufacture, base plate 29 is first assembled with its electrical components and resistance R7 changed to provide the proper value. Thereafter, base plate 29 is assembled into housing 11 and the entire assembly encapsulated by compound 26. Then, plate 73 with brush holder 12 is added and secured to the housing. Lugs 20, 21 are bent over so that their openings align with openings 78, 79 formed in extending attachment lugs of housing 11 and cover plate 73. Lug 64 is inserted in a tension-relieving holding slot 83 formed on brush holder portion 12. The flexible pigtails 85, 86 from brushes 13 and 14 are then connected, by soldering or welding to lugs 64, 65. This completes the assembly of the voltage regulator, and it can be assembled to an alternator.

The circuit of the voltage regulator in a combination circuit with an alternator is illustrated in FIG. 9. Alternator 16 may, for example, have a power output of 2 kw. The connections and elements on resistance plate 47 are illustrated by heavy lines, as mentioned above.

Generator 16 has three output windings U, V, W which supply a load 90 over a three-phase bridge rectifier 87, a floating battery 88, and a switch 89. The load 90 may, for example, be headlights of a vehicle, or other accessories. The negative terminal of battery 88 is connected with chassis (terminal D—). Regulator 10 is likewise connected to chassis (over lugs 20, 21). Terminal 19 (D+) of the regulator is connected over three additional rectifiers 93 to windings U, V, W of generator 16. Terminal 19 is connected over lugs 65 with brush 13, and thus with slip ring 17 of field winding 15. Additionally, it is connected to junction 51 (corresponding to pin 51 of the resistance plate) and to the cathode of diode 44. The anode of diode 44 is connected with brush 14 (terminal DF) and thus to slip ring 18. The anode of diode 44 is additionally connected to junction 55 (corresponding to pin 55 of the resistance plate) and to the collector of transistors 36 and 37. The emitter of transistor 36 is connected to chassis. Pin 36, connected to the resistance plate corresponds to a junction 56 likewise connected to chassis. The emitter of transistor 37, forming a driver stage for the power transistor 36 is connected to the base of transistor 36, as well as to a resistance 39. Resistance 39 is in turn connected to chassis. The emitter of transistor 38 forming a control for transistor 37 is likewise connected to chassis. The collector of transistor 38 is connected to the base of transistor 37, and to junction 52, corresponding to pin 52 on the resistance plate. The base of transistor 38 is connected to the anode of Zener diode 41, and then over a resistance 40 to chassis. The cathode of Zener diode 41 is connected to the cathode of diode 46; the anode of diode 46 is connected to the cathode of diode 45, the anode of which connects to junction 54 (corresponding to pin 54 of the resistance plate), so that the two silicon diodes 45, 46 will be serially connected to Zener diode 41.

A condenser 63 is connected between junction 56 and junction 53 (corresponding to pin 53). Resistance R1, which functions as a coupling resistance, is arranged between junctions 54 and 55, resistance R3 between junctions 51 and 52 and resistance R5 between junctions 51 and 53. Resistance R6 is located between junctions 53 and 54 and resistance R7 between junctions 54 and 56, as also seen in FIG. 8.

The series connection of an ignition switch 94 and a charge control lamp 95 is connected between the positive terminal of battery 88 and plug 19. Upon closing of ignition switch 94, voltage regulator 10 is connected to battery 88 over charge control lamp 95 which will light. The potential at the voltage divider formed of resistances R5, R6, R7 will be so low that Zener diode 41, and with it transistor 38 will remain blocked. Transistor 37 will receive base current over resistance R3 and become conductive, causing conduction of power transistor 36, so that current will flow through field winding 15. Generator 16 will supply power. The voltage at generator 16 will rise until Zener diode 41 becomes conductive, causing transistor 38 to conduct and thus connect the base of transistor 37 to chassis. Transistor 37, as a result, will block, likewise blocking transistor 36. Current from plug 19 to field winding 15 will thus be interrupted. An exponentially decreasing current will, however, flow in field winding 15 through parallel floating diode 44. Since transistor 36 continues to be blocked, junction 55 has a strong positive voltage so that resistance R1 is practically in parallel with resistances R5 and R6, causing increase of the voltage of junction 54 in a positive direction. Zener diode 41 will, in the beginning, remain conductive and will block only when the voltage at plug 19 has dropped. Zener diode 41 will then block, likewise blocking transistor 38, causing transistors 36 and 37 to conduct. Junction 55 will then be practically at chassis potential and resistance R1 will, effectively, be in parallel to resistance R7, so that voltage of the junction 54 will tend in a negative direction. In this manner, transistor 36 will constantly change between its fully conductive and blocked state and field winding 15 will be supplied with an increasing and again decreasing direct current, depending on output potential, thus maintaining the output potential of the generator essentially constant.

Condenser 63 is a smoothing condenser for the voltage divider R5, R6, R7.

Figure 3:
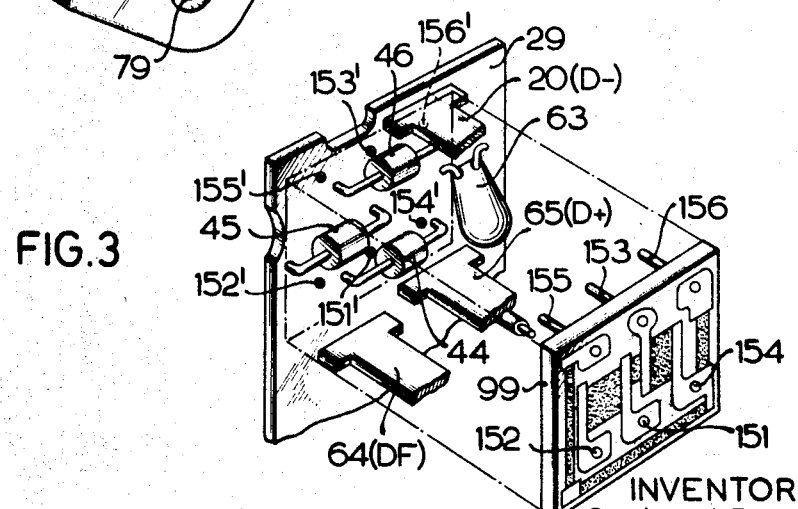
FIG. 3 is an exploded view of a portion of the support plate and the resistance plate.

A modified embodiment of the solid state voltage regulator is illustrated in FIGS. 3, 6 and 7; the circuit will be the same as that in FIG. 9 and those parts which are similar to the ones previously described have been given the same reference numerals and will not be described again.

The resistance plate 99 has six pins 151, 152, 153, 154, 155, 156, connected to junction points in the circuit of FIG. 9: 51, 52, . . . 56, respectively. Pins 151–156 are inserted into corresponding openings 151′–156′ in support plate 29, and soldered to the printed circuit at the reverse side thereof. Pins 155 and 156 have lateral wings, for example, made by deformation or stamping, to form a stop to limit the insertion of the distance of plate 99 into support plate 29. Resistance plate 99 will then stand, similar to a table, with its six pins 151–156 on base plate 29 and be located parallel thereto, and also parallel to the bottom wall 27 of housing 10.

The arrangement of the resistances R1, R3, R5, R6, and R7 on resistance plate 99 is best seen in FIG. 6; the resistances are similarly connected as previously described in connection with FIG. 8.

The voltage regulator of the present invention can be made to be small, compact, while capable of controlling a generator of substantial power output. The reliability of the regulator is high, since it can be completely encapsulated, and immune to extremes of temperature, vibration, and other operating conditions.

Regulators for direct current generators can, of course, be made in a similar manner, such regulators of course not requiring a brush section integral therewith.

The housing of the semiconductor elements can be so formed that the housing itself acts as heat sink or cooling surface. Various other changes and modifications, within the scope of the inventive concept may be made.

We claim:
1. Solid state voltage regulator for automotive-type generators comprising:
  a housing;
  semiconductor elements and impedance elements interconnected into a voltage regulator circuit located in said housing, and an encapsulating resin fully filling said housing to provide an encapsulated voltage regulator;
  a closed transistor shell located in said housing and enclosing at least some of said semiconductor elements, and impedance elements directly connected thereto;
  a resistance plate carrying a plurality of resistances and forming others of said impedance elements located in said housing in a position parallel to a wall thereof;
  and a support plate carrying a printed circuit and located in said housing, said transistor shell, said resistance plate, and the remaining circuit elements of said voltage regulator circuit being secured and electrically connected to said support plate, whereby mechanical stress due to temperature changes will not be transferred to the semiconductor and impedance elements within said shell nor to the separate resistances on said plate.

2. Voltage regulator according to claim 1, in which all resistance elements forming said voltage regulator circuit are located in said shell and on said resistance plate, respectively.

3. Voltage regulator according to claim 1, wherein said plurality of resistances on said resistance plate form an interconnected resistance network;
  and connection pins are provided on said plate interconnected with juction points on said network.

4. Voltage regulator according to claim 1, wherein said support plate is located parallel to a wall of said housing.

5. Voltage regulator according to claim 1, wherein said resistance plate has connecting pins extending in a plane substantially co-planar with said plate, said connecting pins being inserted into openings formed in said support plate, whereby said resistance plate can be mounted close to said support plate, extending at substantially right angles therefrom.

6. Voltage regulator according to claim 5, wherein said pins are soldered to said resistance plate, and to said support plate, the solder forming the pin-resistance plate connection having a higher melting point than the solder of the pin-support plate connection.

7. Voltage regulator according to claim 1, wherein said resistance plate has connecting pins extending at substantially right angles therefrom, said connecting pins being inserted into openings formed in said support plate whereby said resistance plate will be mounted substantially parallel to said support plate and said pins will act as bases and electrical connections.

8. Voltage regulator according to claim 7, where at least some of the pins have an intermediate widening to limit insertion into said support plate and to serve as spacer marks.

9. Voltage regulator according to claim 1, wherein said support plate is formed with openings therein to facilitate flowing of encapsulating material around said plates and semiconductor elements.

10. Voltage regulator according to claim 1, wherein said housing has a bottom plate, spacer members projecting from said bottom plate, said plate being located on said spacer members and having said printed circuit on the side facing said spacer members.

11. Voltage regulator according to claim 1, and connecting lugs secured to said support plate and extending substantially perpendicularly therefrom, outside of said housing, and sealed into said encapsulating material at their junction therethrough.

12. Voltage regulator according to claim 1, in combination with a brush holder, said brush holder comprising a molding secured to said housing.

13. Voltage regulator according to claim 11, in combination with a brush holder, said brush holder comprising a molding secured to said housing, for use with spring-loaded brushes thereon, said connecting lugs being formed to accept the spring pressure of the brush springs in said brush holder.

14. Encapsulated solid state voltage regulator for automotive use adapted for connection to an automotive alternator comprising:
  a substantially rectangular housing having a bottom surface and side surfaces, said bottom surface benig formed with projecting spacer members;
  a support plate carrying a printed circuit located against said spacer members;
  a transistor shell secured to said support plate, said transistor shell having a plurality of interconnected semiconductor elements and resistance elements therein;
  a resistance plate carrying a group of interconnected resistance surfaces thereon and having connecting pins projecting therefrom connected to said resistance surfaces, said pins interconnecting said resistance plate mechanically with said support plate and electrically with said printed circuit on said support plate and locating said resistance plate parallel to one of said surfaces in said housing;
  connecting lugs secured to said support plate and extending perpendicularly therefrom beyond said housing;
  and a settable encapsulating resin completely surrounding said elements and filling said housing and encapsulating said voltage regulator to form a completely sealed unit.

(References on following page)

References Cited

UNITED STATES PATENTS

| | | |
|---|---|---|
| 3,434,018 | 3/1969 | Boczar et al. |
| 3,439,255 | 4/1969 | Carnes et al. ......... 322—28 |

FOREIGN PATENTS

| | | |
|---|---|---|
| 246,275 | 8/1965 | Austria. |

ORIS L. RADER, Primary Examiner
H. HUBERFELD, Assistant Examiner

U.S. Cl. X.R.

310—68; 317—101